United States Patent
Potakowskyj

(12) 
(10) Patent No.: US 6,523,437 B2
(45) Date of Patent: Feb. 25, 2003

(54) DEVICE HAVING A MOTOR AND HAVING A CONTROLLABLE INTERMEDIATE TRANSMISSION GEAR FOR DRIVING A PLURALITY OF DRIVE WHEELS OF THE DEVICE

(75) Inventor: Christoph Potakowskyj, Vienna (AT)

(73) Assignee: Sagem SA, Paris (FR)

( * ) Notice: Subject to any disclaimer, the term of this patent is extended or adjusted under 35 U.S.C. 154(b) by 18 days.

(21) Appl. No.: 09/741,658

(22) Filed: Dec. 19, 2000

(65) Prior Publication Data

US 2001/0023624 A1 Sep. 27, 2001

(30) Foreign Application Priority Data

Dec. 23, 1999 (EP) ............................................. 99890402

(51) Int. Cl.[7] ................................................. F16H 3/62
(52) U.S. Cl. ...................................... 74/810.1; 358/498
(58) Field of Search ....................... 192/43, 416, 48.92; 74/810.1, 318, 319, 321, 352, 354; 358/498, 496, 412; 475/12, 254

(56) References Cited

U.S. PATENT DOCUMENTS

| | | | | |
|---|---|---|---|---|
| 4,065,792 A | * | 12/1977 | Inoue et al. | 101/415.1 |
| 4,422,786 A | * | 12/1983 | Piptone | 400/196.1 |
| 4,762,434 A | * | 8/1988 | Hirano | 400/232 |
| 5,213,426 A | * | 5/1993 | Ewing | 271/114 |
| 5,419,543 A | * | 5/1995 | Nakamura et al. | 271/114 |
| 5,854,696 A | | 10/1996 | Yun | 358/498 |
| 5,760,926 A | * | 6/1998 | Howard et al. | 358/472 |
| 5,826,993 A | * | 10/1998 | Landler et al. | 400/185 |
| 5,954,326 A | * | 9/1999 | Gaarder et al. | 271/10.11 |
| 5,956,152 A | * | 9/1999 | Yamada et al. | 358/296 |
| 5,961,112 A | * | 10/1999 | Kim | 271/10.05 |
| 6,074,304 A | * | 6/2000 | Olbrich et al. | 192/48.92 |

FOREIGN PATENT DOCUMENTS

EP 0505969 A2 3/1992

* cited by examiner

Primary Examiner—Rodney H. Bonck
Assistant Examiner—David D. Le
(74) Attorney, Agent, or Firm—Quarles & Brady LLP

(57) ABSTRACT

A device (1), particularly a facsimile apparatus, has a reversible motor (26), an intermediate transmission gear (29) which is drivable by the motor (26), and three drive wheels (44, 48, 51) which are drivable with the aid of the intermediate transmission gear (29). The intermediate transmission gear (29) includes a basic member (30) which is drivable by the motor (26), a control member (36), and a drive member (37). A first unidirectional coupling of the basic member (30) and the control member (36), and a second unidirectional coupling of the basic member (30) and the drive member (37) are constructed to transmit power in opposite directions of rotation (31, 32). The control member (36) is adapted to selectively establish a drive transmission between the motor (26) and at least one drive wheel (44, 48, 51), and the drive member (37) is adapted to drive the drive wheels (44, 48, 51).

20 Claims, 6 Drawing Sheets

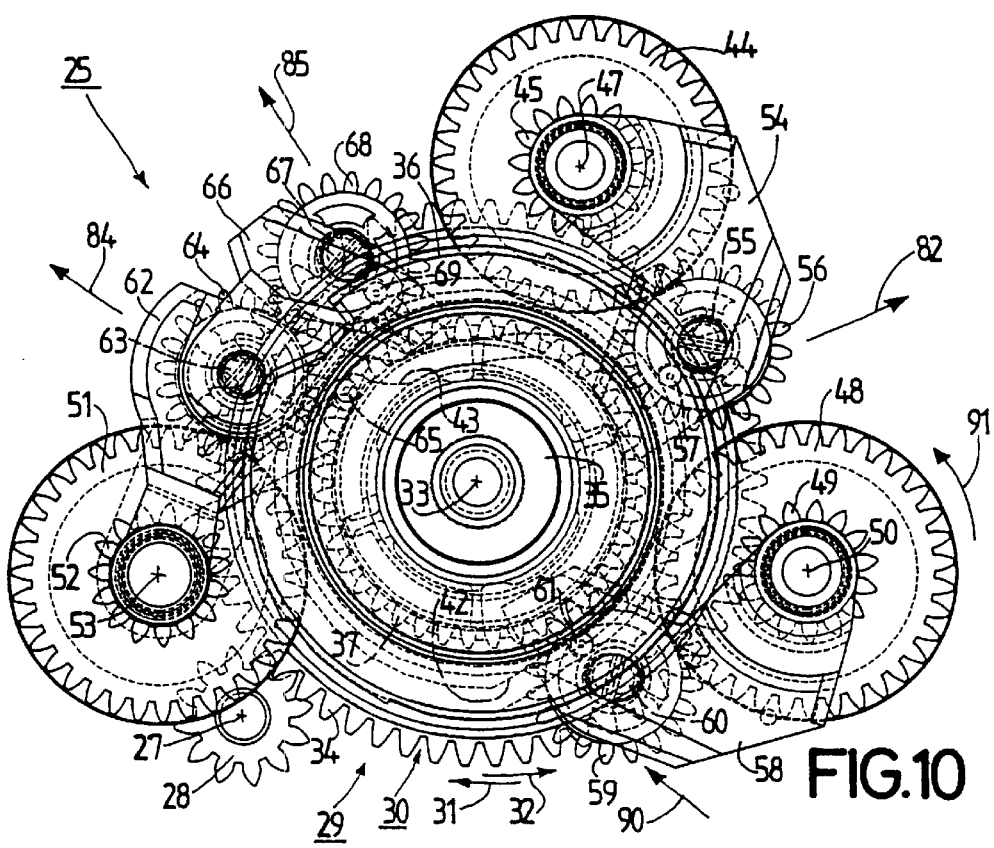
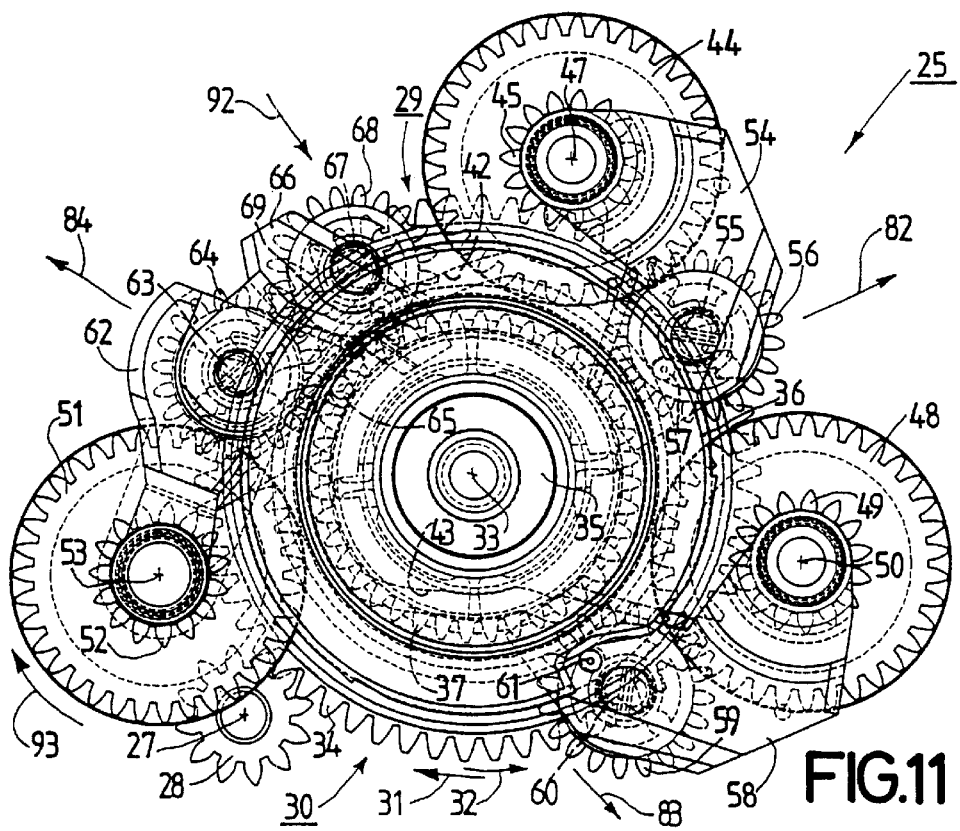

DEVICE HAVING A MOTOR AND HAVING A CONTROLLABLE INTERMEDIATE TRANSMISSION GEAR FOR DRIVING A PLURALITY OF DRIVE WHEELS OF THE DEVICE

BACKGROUND OF THE INVENTION

1. Field of the Invention

The invention generally relates to a device including a motor that can be rotated in two opposing directions, and one or more drive wheels that can be driven by the motor via an intermediate transmission gear. The invention specifically related to an internal coupling of various components of the intermediate transmission gear.

2. Description of the Related Art

Such a device of the type defined in the opening paragraph has been put on the market as a facsimile apparatus having the type designation FAX 750TA and is consequently known. The known device has a reversible motor by in which two intermediate gear wheels can be driven, which gear wheels basically form the intermediate transmission gear and are pivotable in dependence on the direction of rotation of the motor. Each of these two intermediate gear wheels serves for driving two drive wheels of the known device. The known device further includes a solenoid by which it is possible to enable or to inhibit the pivotal movement of each of the two intermediate gear wheels from a first operating position into a second operating position. The solenoid enables four operating conditions to be realized. To realize these four operating conditions, a control formed by the motor and the solenoid are required. Such a solenoid, which is required in addition to the motor, forms an element which is unfavorable both in view of the required space and in view of the cost.

SUMMARY OF THE INVENTION

It is an object of the invention to avoid the aforementioned situation and to provide an improved device in accordance with the invention comprises a plurality of drive wheels of the device that can be driven selectively. A device in accordance with the invention further comprises a motor and does not require an additional solenoid in order to realize different operating conditions. Furthermore, a device in accordance with the invention has the advantage that it is possible to realize not only four operating conditions but even more than four operating conditions, i.e. at least five operating conditions, but also more.

A device in accordance with the invention further comprises an intermediate transmission gear including a basic member, a control member and a drive member as well as a first unidirectional coupling of the basic member and the control member and a second unidirectional coupling of the basic member and the drive member.

The above-mentioned as well as further aspects of the invention will become apparent from the embodiment described hereinafter by way of example and will be elucidated with reference to this example.

BRIEF DESCRIPTION OF THE DRAWINGS

The invention will now be described in more detail with reference to the drawings, which show an embodiment given by way of example but to which the invention is not limited.

FIG. 10 shows, in the same way as FIGS. 6, 7, 8 and 9, the drive and the intermediate transmission gear in a blank-sheet withdrawal condition.

FIG. 11 shows, in the same way as FIGS. 6, 7, 8, 9 and 10, the drive and the intermediate transmission gear in a print-head lifting condition.

DETAILED DESCRIPTION OF THE INVENTION

Figure 1:
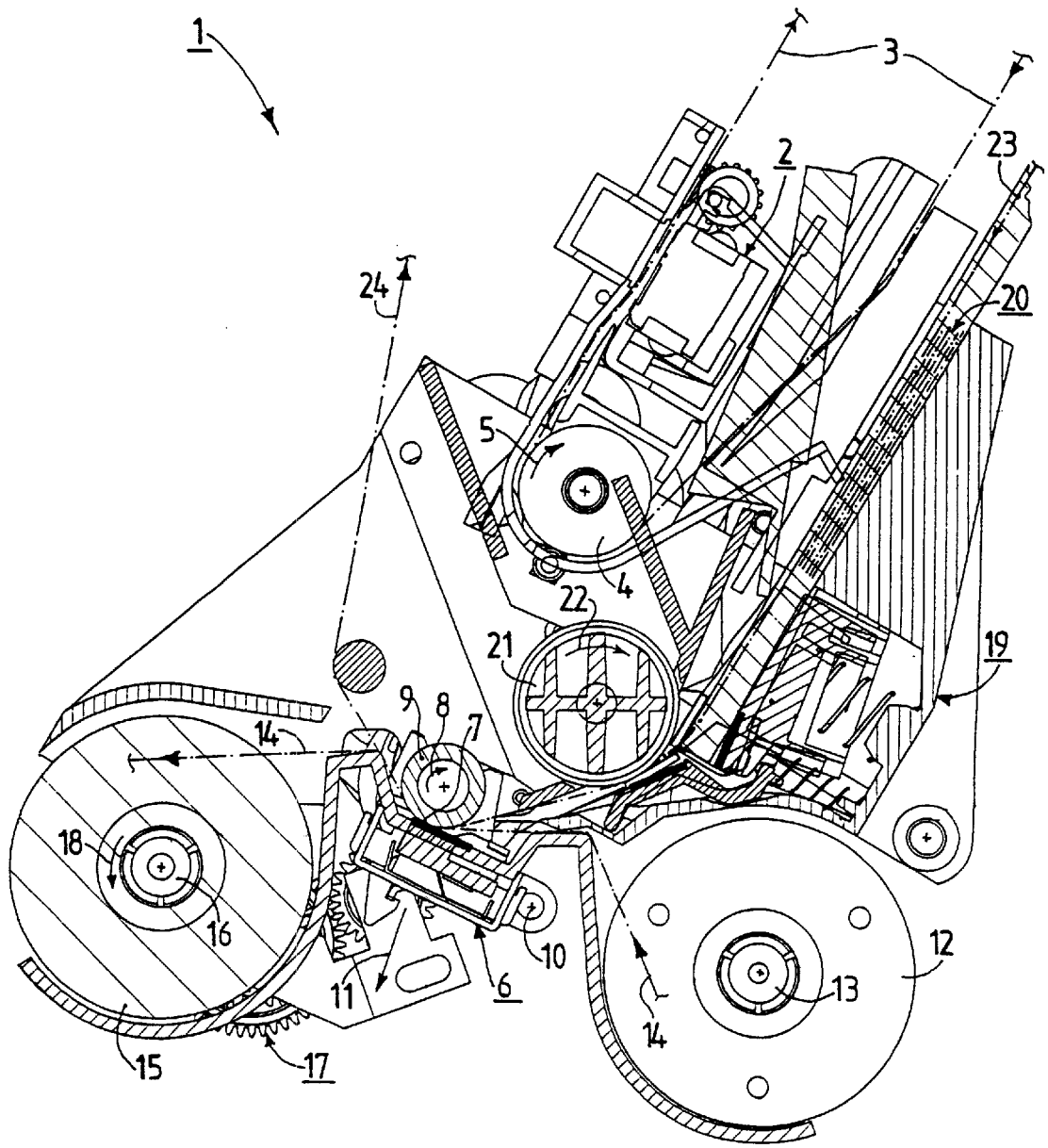
FIG. 1 is a cross-sectional view of a relevant part of a device in accordance with the invention, which includes an original-document feed roller, a blank-sheet withdrawal roller and a printing roller.

FIG. 1 shows a device 1, which is an embodiment of the invention. In the present case, the device 1 is a facsimile apparatus, referred to hereinafter as the device 1.

The device 1 has a scanning device 2 by which an original document can be scanned in order to convert the image information on the original document, for example alphanumeric characters, into digital signals. Such an original document can be fed stepwise along a feed path 3 shown as a dash-dot line in FIG. 1. For such a stepwise feeding, i.e., stepwise driving of an original document, the device 1 includes an original-document feed roller 4, which is rotationally drivable in order to feed an original document in a direction indicated by an arrow 5, i.e., clockwise.

The device 1 further includes a printing device 6 having a print head 7. The print head 7 is a thermal print head which is substantially strip-shaped and by which it is possible to print in a point-by-point fashion. This printing is effected on a blank sheet which can be fed stepwise with the aid of a printing roller 9 which is also drivable in a direction indicated by an arrow 8, i.e., also clockwise. The printing roller 9 cooperates with the print head 7. The printing roller 9 is mounted in the device 1 so as to be rotatable, but apart from that it is stationary. The printing device 6 is held against the printing roller 9 with the aid of a spring, not shown, the print head 7 thus being urged against the printing roller 9 under spring load. The printing device 6 including its print head 7 is pivotable about an axis 10 and is movable in a direction indicated by an arrow 11 away from the printing roller 9. The movement of the printing device 6 away from the printing roller 9 is effected with the aid of an actuating device which is not shown in FIG. 1 and which can be driven by the printing roller 9.

In the device 1, a thermal-transfer printing process can be performed by the print head 7. In this thermal-transfer printing process, a thermal-transfer foil is heated in a point-by-point fashion with the aid of the print head 7, as a result of which a wax-like dye carried by the thermal transfer foil is transferred to the blank sheet to be printed. Said thermal transfer foil is wound onto a first reel 12, the first reel 12 with the supply of thermal transfer foil being carried by a supply mandrel 13. From the first reel 12 the thermal transfer foil is led to a second reel 15 along a feed path 14 thermal transfer foil is led to a second reel 15, which is carried by a take-up mandrel 16, along a feed path 14 shown as a dash-dot line. The take-up mandrel 16 can be driven by the printing roller 9 in a direction indicated by an arrow 18 via a transmission gear 17, which is shown partly in FIG. 1.

In order to print on a blank sheet, such a blank sheet should be withdrawn from a blank-sheet feeder 19 which contains a stack 20 of such blank sheets, i.e., separated from the stack. For this purpose, the device 1 has a blank-sheet withdrawal roller 21, which is rotationally drivable in a direction indicated by an arrow 22, i.e., also clockwise. The instantaneously uppermost blank sheet can be withdrawn from the stack 20 of blank sheets in the blank-sheet feeder 19 and fed into the area between the print head 7 and the printing roller 9. As soon as a blank sheet has:reached the printing roller 9, the blank sheet to be printed is fed further by the printing roller 9, the blank-sheet withdrawal roller 21 then being out of driving engagement, as is already known per se from such devices since a long time. A blank sheet is fed between the blank-sheet feeder 19 and the printing roller 9 along a feed path 23 shown as a dash-dot line. After the blank sheet has been printed the printed sheet is fed along a feed path 24, which is likewise shown as a dash-dot line.

Figure 2:
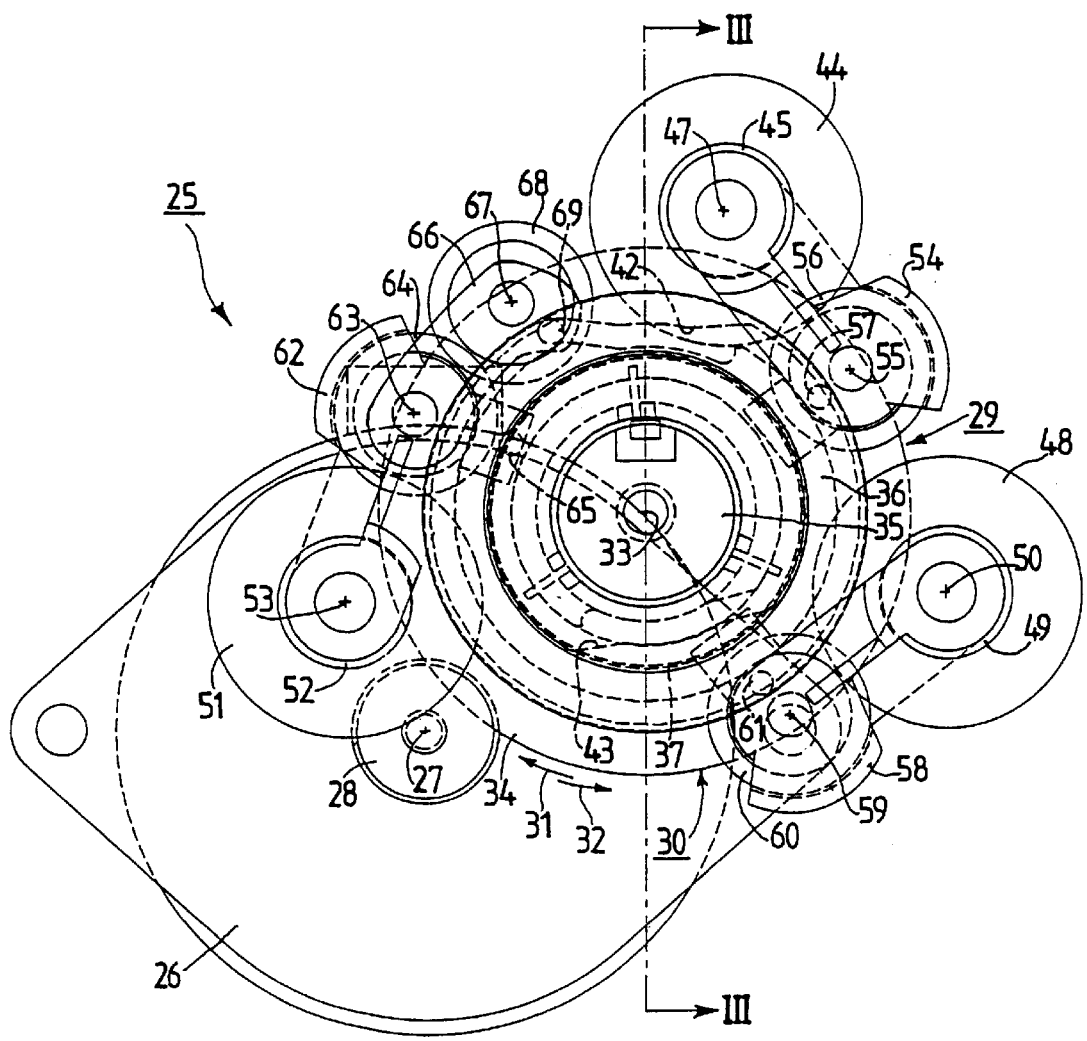
FIG. 2 is a slightly diagrammatical plan view which shows a drive which can be driven by a motor and which include a controllable intermediate transmission gear, with the aid of which the drive, the original-document feed roller, the blank-sheet withdrawal roller and the printing roller can be driven.

Hereinafter, the drive 25 are described with reference to FIG. 2, with the aid of which drive the original-document feed roller 4, the printing roller 9 and the blank-sheet withdrawal roller 21 are rotationally drivable and with the aid of which the printing device 6 can be moved away from the printing roller 9 and with the aid of which the take-up mandrel 16 can also be driven rotationally. Thus, the drive 25 enables a plurality of elements of the device 1 to be driven or actuated in a particularly advantageous manner.

The drive 25 includes a motor 26, which is formed by a stepping motor. The direction of rotation of the motor 26 is reversible. The motor 26 has a motor shaft 27, to which a motor pinion 28 is locked in rotation. The drive 25 further includes an intermediate transmission gear 29. The construction and the operation of the intermediate transmission gear 29 will be apparent from FIGS. 2 to 11.

The intermediate transmission gear 29 has a basic member 30, which is rotationally drivable by the motor 26. The basic member 30 can be driven in a first direction of rotation 31, i.e., in the clockwise direction, as well as in a second direction of rotation 32, i.e., in the counter-clockwise direction. The basic member 30 is supported so as to be rotatable with respect to a primary axis 33. The basic member 30 comprises a disc-shaped gear-wheel portion 34 and a cylindrical driving portion 35. The intermediate transmission gear 29 further includes a rotationally drivable control member 36, which is formed by a circular control disc and a rotationally drivable driving portion 37. The rotationally drivable driving portion 37 is formed by a primary gear wheel. The rotationally drivable driving portion 37 of the intermediate transmission gear 29 is referred hereinafter as the primary gear wheel 37.

Figure 3:
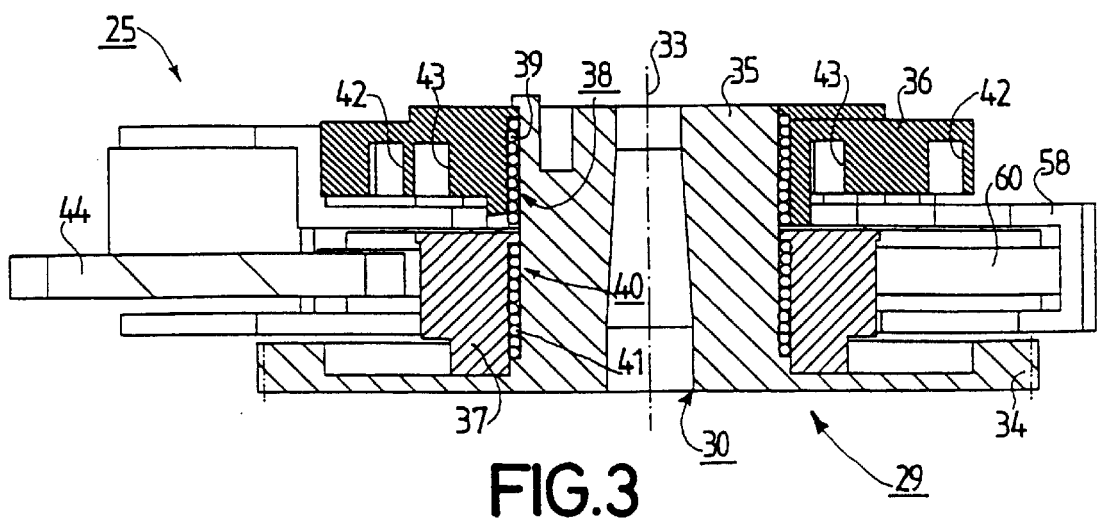
FIG. 3 shows the drive means and the intermediate transmission gear of FIG. 2 in a cross-sectional view taken at the line III—III in FIG. 2.
Figure 4:
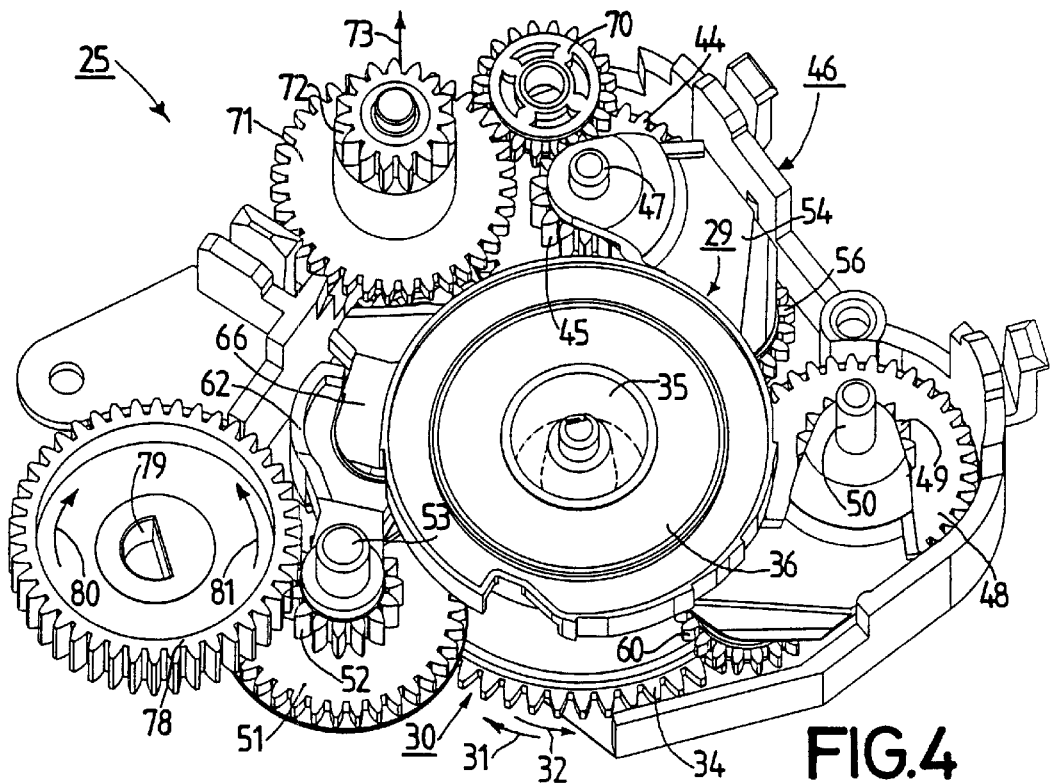
FIG. 4 is an oblique view from the top, which shows drive of FIG. 2, three gear wheels for driving the blank-sheet withdrawal roller not being shown.
Figure 5:
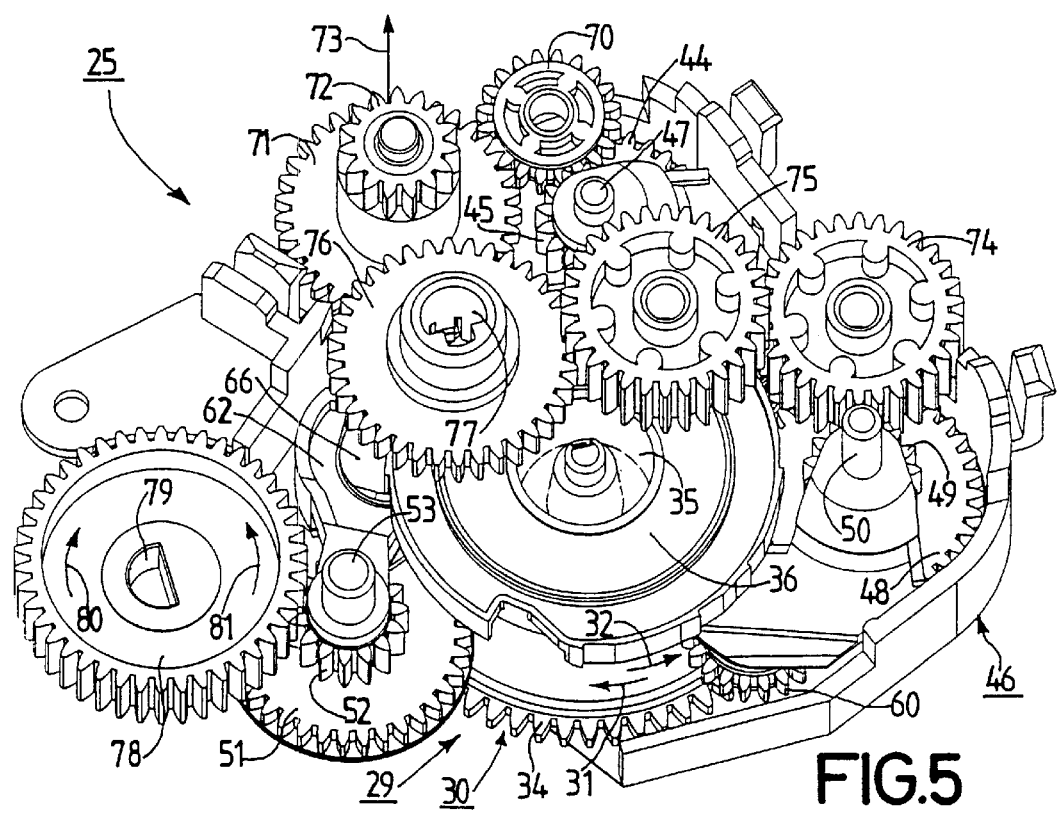
FIG. 5 shows the drive in the same way as FIG. 4 and in addition shows three gear wheels for driving the blank-sheet withdrawal roller.

As is evident particularly from FIG. 3, a first unidirectional coupler 38 is interposed between the basic member 30, i.e., the cylindrical driving portion 35 of the basic member 30, and the control member 36, which coupler 38 is constructed to establish a coupling in the first direction of rotation 31 and which is preferably formed by a single wrap spring 39 whose winding direction has been selected in such a manner that during rotation of the basic member 30 in the first direction of rotation 31, i.e., in the clockwise direction, it contracts onto the cylindrical driving portion 35 of the basic member 30 and consequently provides a drive transmission between the basic member 30 and the control member 36. In order to provide the driving engagement between the first wrap spring 39 and the control member 36, the first wrap spring 39 has a radially bent portion at one end, the bent portion engaging in a groove in the control member 36.

A second unidirectional coupler 40 is interposed between the basic member 30, i.e., the cylindrical driving portion 35 of the basic member 30, and the primary gear wheel 37, which coupler 40 is constructed to establish a coupling in a second direction of rotation 32 opposite to the first direction of rotation 31 and which is preferably formed by a single wrap spring 41. The winding direction of the second wrap spring 41 has now been selected in such a manner that during rotation of the basic member 30 in the second direction of rotation 32, i.e., in the counter-clockwise direction, the wrap spring 41 contracts onto the cylindrical driving portion 35 of the basic member 30 and consequently provides a drive transmission between the basic member 30 and the primary gear wheel 37. In order to provide the drive transmission between the second wrap spring 41 and the primary gear wheel 37, the second wrap spring 41 also has a radially bent portion at one end, the bent portion engaging in a slot in the primary gear wheel 37.

In the intermediate transmission gear 29, as is apparent from FIG. 3, the basic member 30, the control member 36 and the primary gear wheel 37 as well as the two unidirectional couplers 38 and 40 are coaxial with the primary axis 33 and, consequently, with one another. This has the advantage of a particularly compact and space-saving construction.

As regards the control member 36, which is formed by a circular control disc 36, it is to be noted that this control member 36 has two continuous control grooves, i.e. a first control groove 42 and a second control groove 43. The shape of each of the two control grooves 42 and 43 can be seen in FIG. 2 and in FIGS. 6 to 11. The control member 36 serves for selectively providing a drive transmission between the motor 26 and at least one of three drive wheels, as will be described in greater detail hereinafter. After such a drive transmission has been obtained, the primary gear wheel 37 is arranged to drive at least one of the three drive wheels, as will also be described in greater detail hereinafter.

The drive 25 further includes a first secondary gear wheel 44 and a first secondary pinion 45 connected coaxially to the first secondary gear wheel 44. The first secondary gear wheel 44 and the first secondary pinion 45 are rotatable about a first secondary shaft 47 which is stationarily mounted on a carrier 46 for the drive 25, which carrier is shown only in FIGS. 4 and 5. The drive 25 further include a second secondary gear wheel 48 and a second secondary pinion 49 connected coaxially to the second secondary gear wheel 48, which are both rotatable about a stationary second secondary shaft 50. The drive 25 further include a third secondary gear wheel 51 and a third secondary pinion 52 connected coaxially to the third secondary gear wheel 51, which are both rotatable about a third secondary shaft 53.

The drive 25 further include a first pivotal arm 54, which is pivotable about the first secondary shaft 47 and which carries at its free end a first pivotal pinion 56, which is rotatable about a first pinion shaft 55 and which is constantly in mesh with the first secondary gear wheel 44 and can be brought into mesh with the primary gear wheel 37 and is also disengageable from the primary gear wheel 37. A first control pin 57 projects from the first pivotal arm 54 parallel to the primary axis 33. The first control pin 57 engages in the first control groove 42 of the control member 36, as a result of which it is achieved that a pivotal movement of the first pivotal arm 54 and, consequently, a pivotal movement of the first pivotal pinion 56 can be effected with the aid of the first control groove 42 of the control member 36 via the first control pin 57, thus enabling a drive transmission to be realized between the primary gear wheel 37 and the first pivotal pinion 56 and, consequently, the first secondary gear wheel 44.

The drive 25 further include a second pivotal arm 58, which is pivotable about the second secondary shaft 50 and in the area of its free end carries a second pivotal pinion 60, which is rotatable about a second pinion shaft 59 and which is constantly in mesh with the second secondary gear wheel 48 and can be brought into mesh with and is also disengageable from the primary gear wheel 37. A second control pin 61 projects from the second pivotal arm 58 parallel to the primary axis 33 and also engages in the first control groove 42 of the control member 36, the first control groove 42 thus enabling the second pivotal arm 58 and the second pivotal pinion 60 to be pivoted in such a manner that a drive transmission is realized between the primary gear wheel 37 and the second pivotal pinion 60 and, consequently, the second secondary gear wheel 48.

The drive 25 further include a third pivotal arm 62, which is pivotable about the third secondary shaft 53 and in the area of its free end carries a third pivotal pinion 64, which is rotatable about a third pinion shaft 63 and which is constantly in mesh with the third secondary gear wheel 51 and which can be brought into and out of mesh with the primary gear wheel 37. A third control pin 65 projects from the third pivotal arm 62 parallel to the primary axis 33. The third control pin 65 engages in the second control groove 43 of the control member 36, the second control groove 43 thus enabling a movement of the third pivotal arm 63 and of the-third pivotal pinion 64, as a result of which a drive transmission can be realized between the primary gear wheel 37 and the third pivotal pinion 64 and, consequently, the third secondary gear wheel 51.

The drive 25 further include a fourth pivotal arm 66, which is pivotable about the third pinion shaft 63 and in the area of its free end carries a fourth pivotal pinion 68, which is rotatable about a fourth pinion shaft 67 and which is constantly in mesh with the third pivotal pinion 64 and can be brought into and out of mesh with the primary gear wheel 37. A fourth control pin 69 projects from the fourth pivotal arm 66 parallel to the primary axis 33. The fourth control pin 69 engages in the first control groove 42 of the control member 36, the first control groove thus enabling the fourth pivotal arm 66 and, consequently, the fourth pivotal pinion 68 to be pivoted in such a manner that a drive transmission can be realized between the primary gear wheel 37 and the fourth pivotal pinion 68 and the third pivotal pinion 64 and the third secondary gear wheel 51. As regards the fourth pivotal pinion 68 and the third pivotal pinion 64 it is to be noted that only one of these two pivotal pinions 68 and 64 at a time can be brought into mesh with the primary gear wheel 37, i.e., either the fourth pivotal pinion 68 or the third pivotal pinion 64.

The first secondary gear wheel 44 serves for driving the original-document feed roller 4 in order to obtain the stepwise transport of an original document to be scanned. In this connection, reference is made to FIGS. 4 and 5. As is apparent from these two Figures, a first original-document pinion 70 is constantly in mesh with the secondary pinion 45, which is coaxial with the first secondary gear wheel 44. The first original-document pinion 70 is constantly in mesh with a first original-document gear wheel 71. The first original-document gear wheel 71 is constantly in mesh with a second original-document pinion 72. Further original-document gear wheels 73 are in mesh with the original-document pinion 72, but these gear wheels are shown only diagrammatically as an arrow 73 in FIGS. 4 and 5. The original-document feed roller 4 is rotationally drivable via the further original-document gear wheels 73 in the direction indicated by the arrow 5.

The second secondary gear wheel 48 serves for driving the blank-sheet withdrawal roller 21. For this purpose, the second secondary pinion 49, which is coaxially connected to the second secondary gear wheel 48, is constantly in mesh with a first blank-sheet withdrawal gear wheel 74. The first blank-sheet withdrawal gear wheel 74 is in mesh with a second blank-sheet withdrawal gear wheel 75. The second blank-sheet withdrawal gear wheel 75 is constantly in mesh with a third blank-sheet withdrawal gear wheel 76. The third blank-sheet withdrawal gear wheel 76 is coaxially connected to a driving sleeve 77. Via the driving sleeve 77 the blank-sheet withdrawal roller 21, which is coaxial with the driving sleeve 77, can be driven directly, for which purpose the blank-sheet withdrawal roller 21 has a drive projection which extends into the driving sleeve 77.

The third secondary gear wheel 51 serves for driving the printing roller 9 and thus, in addition, for driving the take-up mandrel 16 for the thermal transfer foil and, in addition, for moving the printing device 6, in order to lift the printing device 6 from the printing roller 9. For this purpose, the third secondary pinion 52, which is connected coaxially to the third secondary gear wheel 51, is constantly in mesh with a printing-roller gear wheel 78. The printing-roller gear wheel 78 has a driving sleeve 79, into which a driving projection which projects from the printing roller 9 engages. When the third pivotal pinion 64 is in mesh with the primary gear wheel 37 the printing-roller gear wheel 78 can be driven in a first direction of rotation 80, which corresponds to the direction of rotation 8 in FIG. 1. When the printing-roller gear wheel 78 is driven in the first direction of rotation 80, this causes the printing roller 9 to be driven in the direction of rotation 8 and the take-up mandrel 16 to be rotated in the direction of rotation 18 via the transmission gear 17. When the fourth pivotal pinion 68 is in driving engagement with the primary gear wheel 37, the printing-roller gear wheel 78 can be driven in a second direction of rotation 81. In this case, the printing device 6 is moved in a direction indicated by the arrow 11 with the aid of the printing-roller gear wheel 78, as a result of which the print head 7 is lifted off the printing roller 9 and remains lifted. In this case, the printing roller 9 is driven in a direction opposite to that indicated by the arrow 8 but this has no effect because the print head 7 is clear of the printing roller 9. In this case, the take-up mandrel 16 is not driven by the printing roller 9, because a further unidirectional coupler is included in the drive transmission between the printing roller 9 and the take-up mandrel 16, which in this operating condition ensures that the drive transmission between the printing roller 9 and the take-up mandrel 16 is disengaged.

Figure 6:
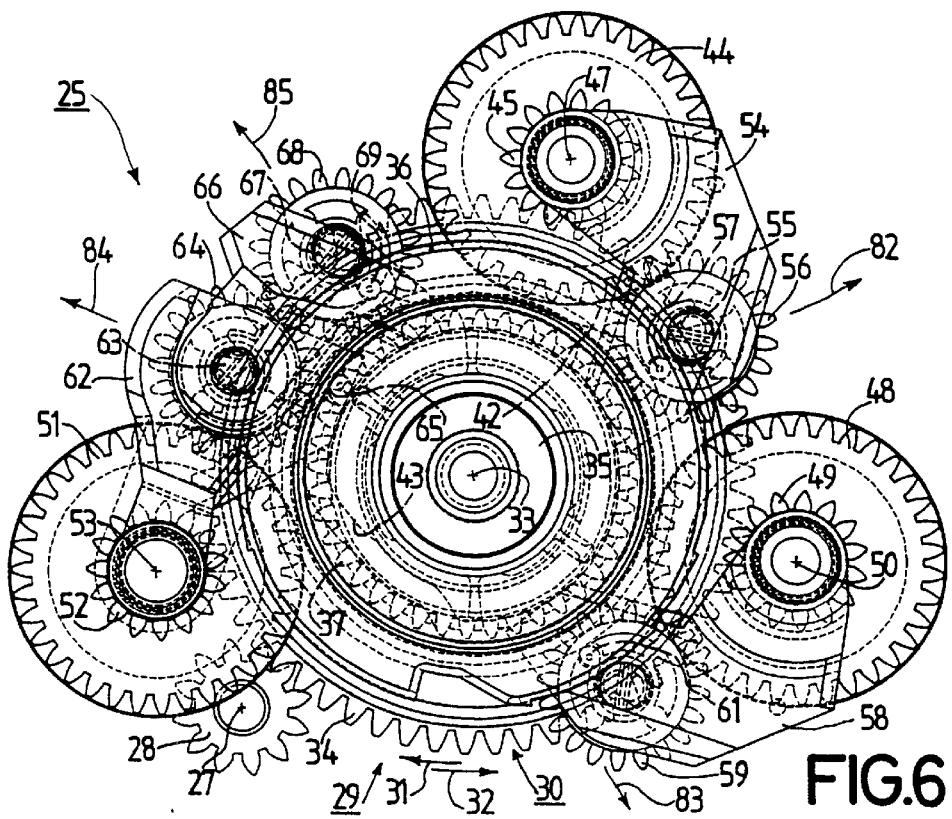
FIG. 6 is a plan view which shows the drive means of FIGS. 2, 4 and 5, the drive and the intermediate transmission gear being shown in an initial condition.

FIG. 6 shows a rest condition or initial condition of the drive 25 and the intermediate transmission gear 29. In this initial condition, all the four pivotal pinions 56, 60, 64 and 68 are kept away from the primary gear wheel 37, namely as indicated by the arrows 82, 83, 84 and 85, with the aid of the four control pins 57, 61, 65 and 69 and the four control grooves 42 and 43.

The drive 25 and the intermediate transmission gear 29 can be brought from the initial condition shown in FIG. 6 into the scan-mode condition. In order to perform this change of condition the basic member 30 and, consequently, the first wrap spring 39 of the control member 36 is driven in the first direction of rotation 31, namely until the control member 36 assumes the position shown in FIG. 7. In this position of the control member 36, the first control groove 42 occupies such a position that with the aid of the first control groove 42, the first control pin 57 and, consequently, the first pivotal arm 54 and the first pivotal pinion 56 are moved in a direction indicated by an arrow 86, which direction is opposite to that indicated by the arrow 82, as a result of which with the aid of the first pivotal pinion 56, a drive transmission is obtained between the primary gear wheel 37 and the first secondary gear wheel 44 and the first secondary pinion 45, thereby enabling the original-document feed roller 4 of the device 1 to be driven. As soon as the control member 36 has assumed the position shown in FIG. 7, the direction of rotation of the motor 26 is reversed, as a result of which the basic member 30 and, via the second wrap spring 41, the primary gear wheel 37 is driven in the second direction of rotation 32. As a result of this, the first secondary gear wheel 44 and the first secondary pinion 45 are driven in a direction indicated by an arrow 87 via the first pivotal pinion 56, which in the end causes the original-document feed roller 4 to be driven in the direction indicated by the arrow 5.

Figure 7:
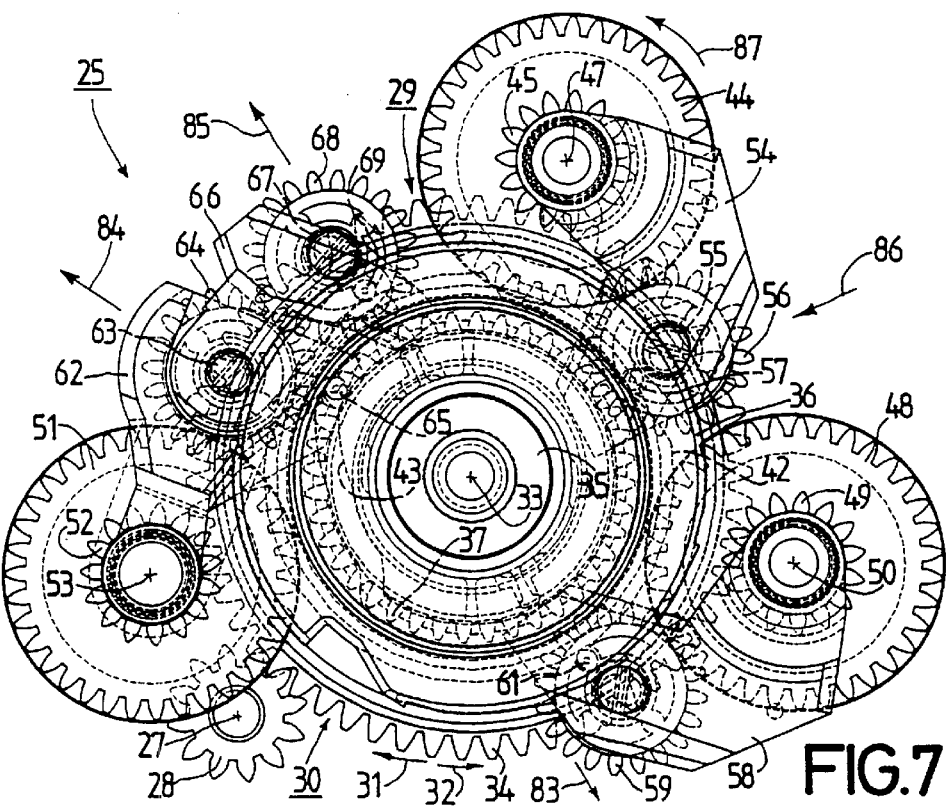
FIG. 7 shows, in the same way as FIG. 6, the drive and the intermediate transmission gear of FIG. 6 in a scan-mode condition.
Figure 8:
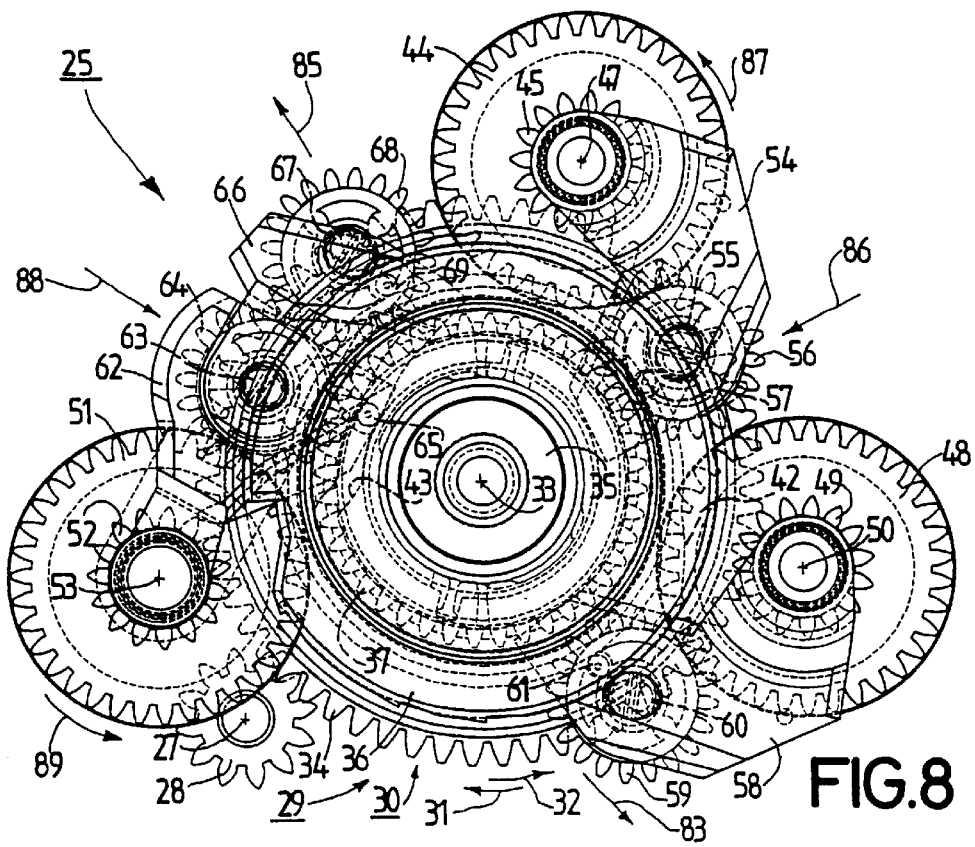
FIG. 8 shows, in the same way as FIGS. 6 and 7, the drive and the intermediate transmission gear in a copy-mode condition.
Figure 9:
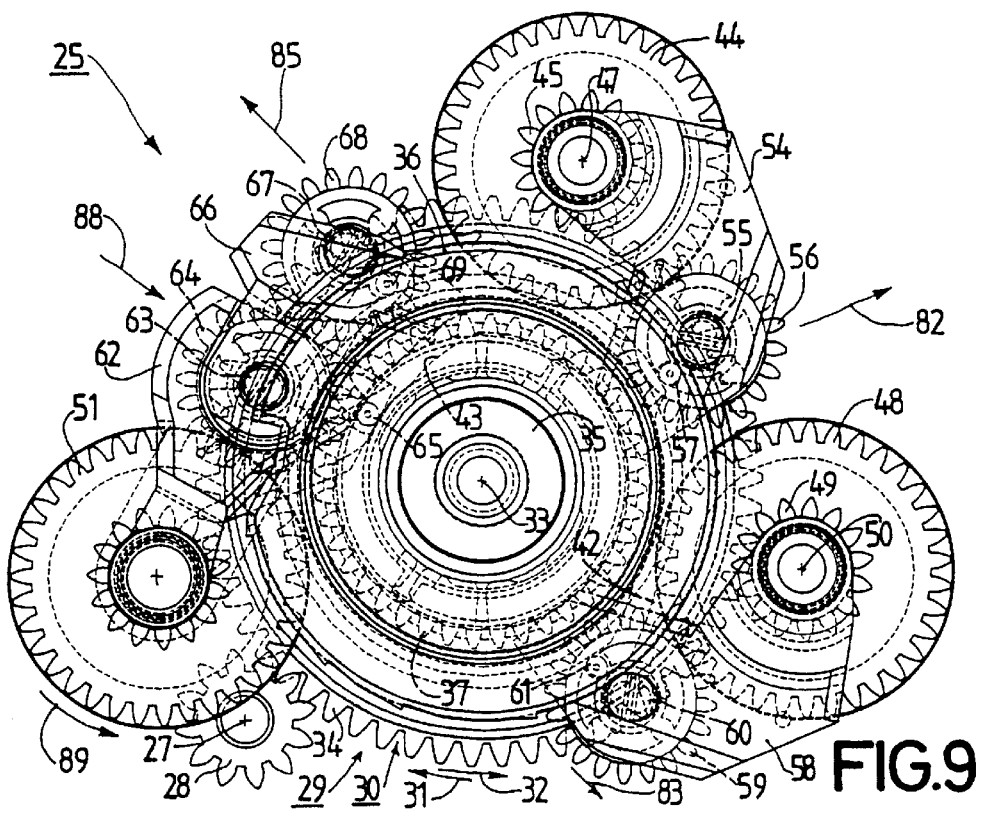
FIG. 9 shows, in the same way as FIGS. 6, 7 and 8, the drive and the intermediate transmission gear in a print-mode condition.

The drive 25 and the intermediate transmission gear 29 can be brought from the initial condition shown in FIG. 6 and from the scan-mode condition shown in FIG. 7 into a copy-mode condition illustrated in FIG. 8. In order to reach this copy-mode condition, the control member 36 is first driven in the first direction of rotation 31 via the basic member 30 and the first wrap spring 39, until the control member 36 occupies the position shown in FIG. 8. In this position of the control member 36, the first pivotal pinion 56 has been moved in the direction indicated by the arrow 86, the second pivotal pinion 60 in the direction indicated by the arrow 83, the third pivotal pinion 64 in a direction indicated by an arrow 88 opposite to that indicated by the arrow 84, and the fourth pivotal pinion 68 in the direction indicated by the arrow 85, namely by the four control pins 57, 61, 65 and 69 and the two control grooves 42 and 43. As soon as the copy-mode condition shown in FIG. 8 is reached, the direction of rotation of the motor 26 is reversed, as a result of which the basic member 30 subsequently drives the primary gear wheel 37 via the second wrap spring 41, which enables the first secondary gear wheel 44 to be driven in the direction indicated by the arrow 87 via the first pivotal pinion 56 and the third secondary gear wheel 51 to be driven in a direction indicated by an arrow 89 via the third pivotal pinion 64. In this way, the original-document feed roller 4 can be driven with the aid of the first secondary gear wheel 44 and the printing roller 9 as well as the take-up mandrel 16 can be driven with the aid of the third secondary gear wheel 51 at the same time, as is required for operation in the copy mode.

The drive 25 and the intermediate transmission gear 29 can likewise be brought into a print-mode condition as already described with reference to FIGS. 7 and 8, in which the first pivotal pinion 56 has been moved in the direction indicated by the arrow 82, the second pivotal pinion 60 in the direction indicated by the arrow 83, the third pivotal pinion 64 in the direction indicated by the arrow 88, and the fourth pivotal pinion 68 in the direction indicated by the arrow 85, namely by the four control pins 57, 61, 65 and 69 and the two control grooves 42 and 43. Thus, in the print-mode condition the third pivotal pinion 64 is thus in mesh with the primary gear wheel 37, as a result of which the third secondary gear wheel 51 can be driven in the direction indicated by the arrow 89 and, consequently, the printing roller 9 and the take-up mandrel 16 can be driven as required for operation in the print mode.

The drive 25 and the intermediate transmission gear 29 can also be brought from the conditions shown in FIGS. 6, 7, 8 and 9 into a blank-sheet-withdrawal mode condition, which is illustrated in FIG. 10. In order to reach this condition, the basic member 30 is first driven in the first direction of rotation 31, as a result of which the control member 36 is also driven in the first direction of rotation 31 via the first wrap spring 39, which is effected until the control member 36 has reached the position shown in FIG. 10. In this position of the control member 36, the first pivotal pinion 56 has been moved in the direction indicated by the arrow 82, the second pivotal pinion 60 in a direction indicated by an arrow 90 opposite to the direction indicated by the arrow 83, the third pivotal pinion 64 in the direction indicated by the arrow 84, and the fourth pivotal pinion 68 in the direction indicated by the arrow 85, namely by the four control pins 57, 61, 65 and 69 and the two control grooves 42 and 43. In this blank-sheet-withdrawal mode condition only the second secondary gear wheel 48 is in driving engagement with the primary gear wheel 37, namely via the second pivotal pinion 60, so that in this case only the second secondary gear wheel 48 can be driven. As soon as the blank-sheet-withdrawal mode condition shown in FIG. 10 is reached, the direction of rotation of the motor 26 is reversed and, as a consequence, the basic member 30 is driven in the second direction of rotation 32, as a result of which the primary gear wheel 37 is driven via the second wrap spring 41, which in its turn causes the second secondary gear wheel 48 to be set into rotation in a direction indicated by an arrow 91 via the second pivotal pinion 60. The second secondary gear wheel 48 drives driving sleeve 77, which is connected to the third blank-sheet-withdrawal gear wheel 76, via the second secondary pinion 49 and the three blank-sheet withdrawal gear wheels 74, 75 and 76, as a result of which the blank-sheet withdrawal roller 21 is driven. Thus, the uppermost blank sheet can be withdrawn from the blank sheet stack 20 and fed to the printing roller 9 with the aid of the blank-sheet withdrawal roller 21.

Finally, the drive 25 and the intermediate transmission gear 29 can also be brought into a print-head lift mode condition illustrated in FIG. 11, which is effected in a manner similar to that described for the afore-mentioned conditions, namely in that first of all the control member 36 is driven by the basic member 30 in the first direction of rotation 31 via the first wrap spring 39 and, after the print-head lift mode condition has been reached, the primary gear wheel 37 is driven in the second direction of rotation 32 by the basic member 30 via the second wrap spring 41. In the print-head lift mode condition the first pivotal pinion 56 has been moved in the direction indicated by the arrow 82, the third pivotal pinion 64 in the direction indicated by the arrow 84, and the fourth pivotal pinion 68 in the direction indicated by an arrow 92 opposite to the direction indicated by the arrow 85, namely by the four control pins 57, 61, 65 and 69 and the two control grooves 42 and 43. In the print-head lift mode condition only the fourth pivotal pinion 68 is in driving engagement with the primary gear wheel 37, as a result of which in this case the third secondary gear wheel 51 can be driven in a direction of rotation 93 opposite to the direction of rotation 89. This driving of the third secondary gear wheel 51 in the direction indicated by the arrow 93 is converted into a pivotal movement of the printing device 6 about the pivotal axis 10 in the direction indicated by the arrow 11. For the sake of simplicity, the actuator required for this purpose is not shown.

The invention is not limited to the embodiment described hereinbefore by way of example. Instead of a wrap-spring, other unidirectional coupler may be provided. Alternatively, one wrap-spring may include two wrap springs. Moreover, a construction may be chosen in which one basic member and one control member as well as, for example, a drive member formed by a primary gear wheel 37 are not disposed coaxially with one another but are rotatable about axes which are displaced with respect to one another.

What is claimed is:

1. A device, comprising:
   a motor operable to be rotated in a first direction and a second direction;
   at least two drive wheels; and
   an intermediate gear operable to establish a drive transmission between said motor and one or more of said at least two drive wheels, said intermediate gear including
   a basic member operable to be rotated by said motor in the first direction and the second direction,
   a rotationally drivable control member,
   a first unidirectional coupler operable to form a coupling between said basic member and said rotationally drivable control member when said basic member is rotated in the first direction,
   a rotationally drivable drive member, and
   a second unidirectional coupler operable to form a coupling between said basic member and said rotationally drivable drive member when said basic member is rotated in the second direction.

2. The device of claim 1, wherein said first unidirectional coupler includes a wrap-spring.

3. The device of claim 1, wherein said second unidirectional coupler includes a wrap-spring.

4. The device of claim 1, further comprising:
   an original-document feed roller, wherein a first drive wheel of said at least two drive wheels is operable to drive said original-document feed roller for a transport of an original document to be scanned by said device.

5. The device of claim 1, further comprising:
   a blank-sheet withdrawal roller, wherein a first drive wheel of said at least two drive wheels is operable to drive said blank-sheet withdrawal roller.

6. The device of claim 1, further comprising:
   a printing roller, wherein a first drive wheel of said at least two drive wheels is operable to drive said printing roller for a transport of a blank sheet to be printed by said device.

7. A device, comprising:
   a motor operable to be rotated in a first direction and a second direction;
   at least two drive wheels; and
   an intermediate gear operable to establish a drive transmission between said motor and one or more of said at least two drive wheels, said intermediate gear including
   a basic member operable to be rotated by said motor in the first direction and the second direction,
   a rotationally drivable control member,
   a first unidirectional coupler operable to form a coupling between said basic member and said rotationally drivable control member when said basic member is rotated in the first direction,
   a rotationally drivable drive member, and
   a second unidirectional coupler operable to form a coupling between said basic member and said rotationally drivable drive member when said basic member is rotated in the second direction,
   wherein said first unidirectional coupler and said second unidirectional coupler are coaxial.

8. The device of claim 7, wherein said rotationally drivable control member, said first unidirectional coupler and said second unidirectional are coaxial.

9. The device of claim 7, wherein said basis member, said rotationally drivable control member, said first unidirectional coupler and said second unidirectional are coaxial.

10. The device of claim 7, herein said rotationally drivable drive member, said first unidirectional coupler and said second unidirectional are coaxial.

11. The device of claim 7, wherein said basis member, said rotationally drivable drive member, said first unidirectional coupler and said second unidirectional are coaxial.

12. The device of claim 7, further comprising:
    an original-document feed roller, wherein a first drive wheel of said at least two drive wheels is operable, to drive said original-document feed roller for a transport of an original document to be scanned by said device.

13. The device of claim 7, further comprising:
    a blank-sheet withdrawal roller, wherein a first drive wheel of said at least two drive wheels is operable to drive said blank-sheet withdrawal roller.

14. The device of claim 7, further comprising:
    a printing roller, wherein a first drive wheel of said at least two drive wheels is operable to drive said printing roller for a transport of a blank sheet to be printed by said device.

15. A device, comprising:
    a motor operable to be rotated in a first direction and a second direction;
    at least two drive wheels; and
    an intermediate gear operable to establish a drive transmission between said motor and one or more of said at least two drive wheels, said intermediate gear including
    a basic member operable to be rotated by said motor in the first direction and the second direction,
    a rotationally drivable control member having at least one control groove,
    a first unidirectional coupler operable to form a coupling between said basic member and said rotationally drivable control member when said basic member is rotated in the first direction,
    a rotationally drivable drive member, and
    a second unidirectional coupler operable to form a coupling between said basic member and said rotationally drivable drive member when said basic member is rotated in the second direction.

16. The device of claim 15, wherein said first unidirectional coupler includes a wrap-spring.

17. The device of claim 15, wherein said second unidirectional coupler includes a wrap-spring.

18. The device of claim 15, further comprising:

an original-document feed roller, wherein a first drive wheel of said at least two drive wheels is operable to drive said original-document feed roller for a transport of an original document to be scanned by said device.

19. The device of claim 15, further comprising:

a blank-sheet withdrawal roller, wherein a first drive wheel of said at least two drive wheels is operable to drive said blank-sheet withdrawal roller.

20. The device of claim 15, further comprising:

a printing roller, wherein a first drive wheel of said at least two drive wheels is operable to drive said printing roller for a transport of a blank sheet to be printed by said device.

* * * * *